US011949753B2

(12) United States Patent
Nakamura

(10) Patent No.: US 11,949,753 B2
(45) Date of Patent: *Apr. 2, 2024

(54) INFORMATION PROCESSING APPARATUS, INFORMATION PROCESSING SYSTEM, AND INFORMATION PROCESSING METHOD

(71) Applicant: SONY GROUP CORPORATION, Tokyo (JP)

(72) Inventor: Masanobu Nakamura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/069,383

(22) Filed: Dec. 21, 2022

(65) Prior Publication Data

US 2023/0118228 A1  Apr. 20, 2023

Related U.S. Application Data

(63) Continuation of application No. 16/979,337, filed as application No. PCT/JP2019/002706 on Jan. 28, 2019, now Pat. No. 11,558,482.

(30) Foreign Application Priority Data

Mar. 28, 2018  (JP) .................................. 2018-061209

(51) Int. Cl.
*H04L 67/56* (2022.01)
*G05D 1/00* (2006.01)

(52) U.S. Cl.
CPC ............. *H04L 67/56* (2022.05); *G05D 1/021* (2013.01)

(58) Field of Classification Search
CPC ...... A63H 11/00; G05D 1/0027; G05D 1/021; H04L 67/12; H04L 67/56; H04L 67/562
See application file for complete search history.

(56) References Cited

U.S. PATENT DOCUMENTS

| 2007/0205910 A1* | 9/2007 | Guite | A61B 90/92 318/16 |
| 2010/0153317 A1* | 6/2010 | Lee | B25J 9/1661 901/50 |
| 2013/0123980 A1* | 5/2013 | Seo | G05B 19/41815 700/248 |

(Continued)

FOREIGN PATENT DOCUMENTS

| CN | 104981963 A | 10/2015 |
| EP | 2930715 A1 | 10/2015 |
| EP | 2955815 A1 | 12/2015 |

(Continued)

OTHER PUBLICATIONS

International Search Report and Written Opinion of PCT Application No. PCT/JP2019/002706, dated Mar. 19, 2019, 07 pages of English Translation and 07 pages of ISRWO.

(Continued)

*Primary Examiner* — Gil H. Lee
(74) *Attorney, Agent, or Firm* — CHIP LAW GROUP

(57) ABSTRACT

Provided is an information processing apparatus having a control unit configured to execute instruction proxy processing in a case where an instruction from a user specifies another information processing apparatus as an instruction target.

15 Claims, 10 Drawing Sheets

(56) References Cited

U.S. PATENT DOCUMENTS

2015/0287411 A1    10/2015  Kojima et al.

FOREIGN PATENT DOCUMENTS

| JP | 2002-178233 A | 6/2002 |
|----|---------------|--------|
| JP | 2003-345435 A | 12/2003 |
| JP | 2005-167637 A | 6/2005 |
| JP | 2015-201739 A | 11/2015 |
| JP | 2017-052075 A | 3/2017 |
| JP | 2017-139962 A | 8/2017 |
| WO | 2014/122943 A1 | 8/2014 |

OTHER PUBLICATIONS

International Preliminary Report on Patentability of PCT Application No. PCT/JP2019/002706, dated Oct. 8, 2020, 08 pages of English Translation and 04 pages of IPRP.
Non-Final Office Action for U.S. Appl. No. 16/979,337, dated Dec. 8, 2021, 16 pages.
Final Office Action for U.S. Appl. No. 16/979,337, dated Jun. 8, 2022, 12 pages.
Advisory Office Action for U.S. Appl. No. 16/979,337, dated Aug. 15, 2022, 03 pages.
Notice of Allowance for U.S. Appl. No. 16/979,337, dated Sep. 23, 2022, 08 pages.

* cited by examiner

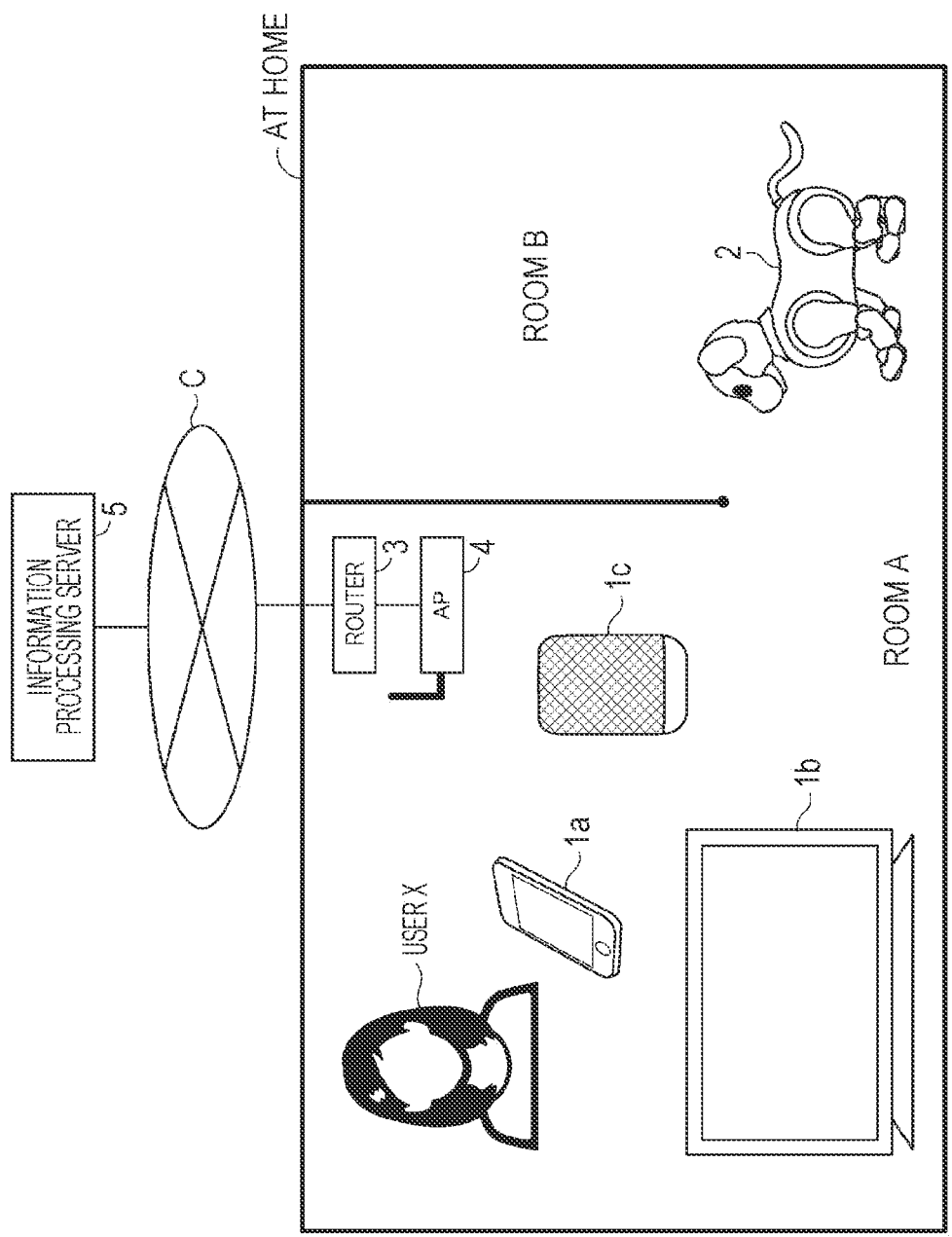

INFORMATION PROCESSING APPARATUS, INFORMATION PROCESSING SYSTEM, AND INFORMATION PROCESSING METHOD

CROSS REFERENCE TO RELATED APPLICATIONS

This application is a continuation application of U.S. patent application Ser. No. 16/979,337, filed on Sep. 9, 2020, which is a U.S. National Phase of International Patent Application No PCT/JP2019/002706 filed on Jan. 28, 2019, which claims priority benefit of Japanese Patent Application No. JP 2018-061209 filed in the Japan Patent Office on Mar. 28, 2018. Each of the above-referenced applications is hereby incorporated herein by reference in its entirety.

TECHNICAL FIELD

The present disclosure relates to an information processing apparatus, an information processing system, an information processing method, and an information processing program.

BACKGROUND ART

Nowadays, opportunities to use various information processing apparatuses in daily life and business are increasing. For example, there are cases where a plurality of various information processing apparatuses is installed even at home. Furthermore, as an information processing apparatus, a smart speaker that communicates with a user, or a robot capable of communicating and autonomous traveling (moving) has also been developed and commercialized. As described above, while a plurality of information processing apparatuses is used at home or in an office, performing processes in cooperation between the information processing apparatuses is also considered in Patent Documents 1 to 3.

CITATION LIST

Patent Document

Patent Document 1: Japanese Patent Application Laid-Open No. 2003-345435
Patent Document 2: Japanese Patent Application Laid-Open No. 2017-52075
Patent Document 3: Japanese Patent Application Laid-Open No. 2002-178233

SUMMARY OF THE INVENTION

Problems to be Solved by the Invention

In such fields, it is desired to smoothly communicate between users and various information processing apparatuses including robots.

An object of the present disclosure is to provide an information processing apparatus, an information processing system, an information processing method, and an information processing program that realize smooth communication between an information processing apparatus and a user.

Solutions to Problems

The present disclosure is, for example,
an information processing apparatus
having a control unit configured to execute instruction proxy processing in a case where an instruction from a user specifies another information processing apparatus as an instruction target.

The present disclosure is, for example,
an information processing system
having an information processing apparatus configured to receive an instruction from a user, and execute instruction proxy processing in a case where the instruction specifies another information processing apparatus as an instruction target.

The present disclosure is, for example,
an information processing method including:
executing instruction proxy processing in a case where an instruction from a user specifies another information processing apparatus as an instruction target.

The present disclosure is, for example,
an information processing program
that causes a computer to execute instruction proxy processing in a case where an instruction from a user specifies another information processing apparatus as an instruction target.

Effects of the Invention

According to at least one embodiment of the present disclosure, smooth communication can be performed between a user and an information processing apparatus that is an instruction target. The effects described herein are not necessarily limited, and any of the effects described in the present disclosure is possible. Furthermore, the contents of the present disclosure are not to be construed as being limited by the exemplified effects.

BRIEF DESCRIPTION OF DRAWINGS

FIG. 10 is a diagram for explaining a usage situation of an information processing system according to an embodiment.

MODE FOR CARRYING OUT THE INVENTION

Hereinafter, embodiments and the like of the present disclosure will be described with reference to the drawings. Note that the description will be given in the following order.

<1. First embodiment>
<2. Second embodiment>
<3. Modification>

Embodiments and the like described below are preferred specific examples of the present disclosure, and the contents of the present disclosure are not limited to these embodiments.

1. First Embodiment

Figure 1:
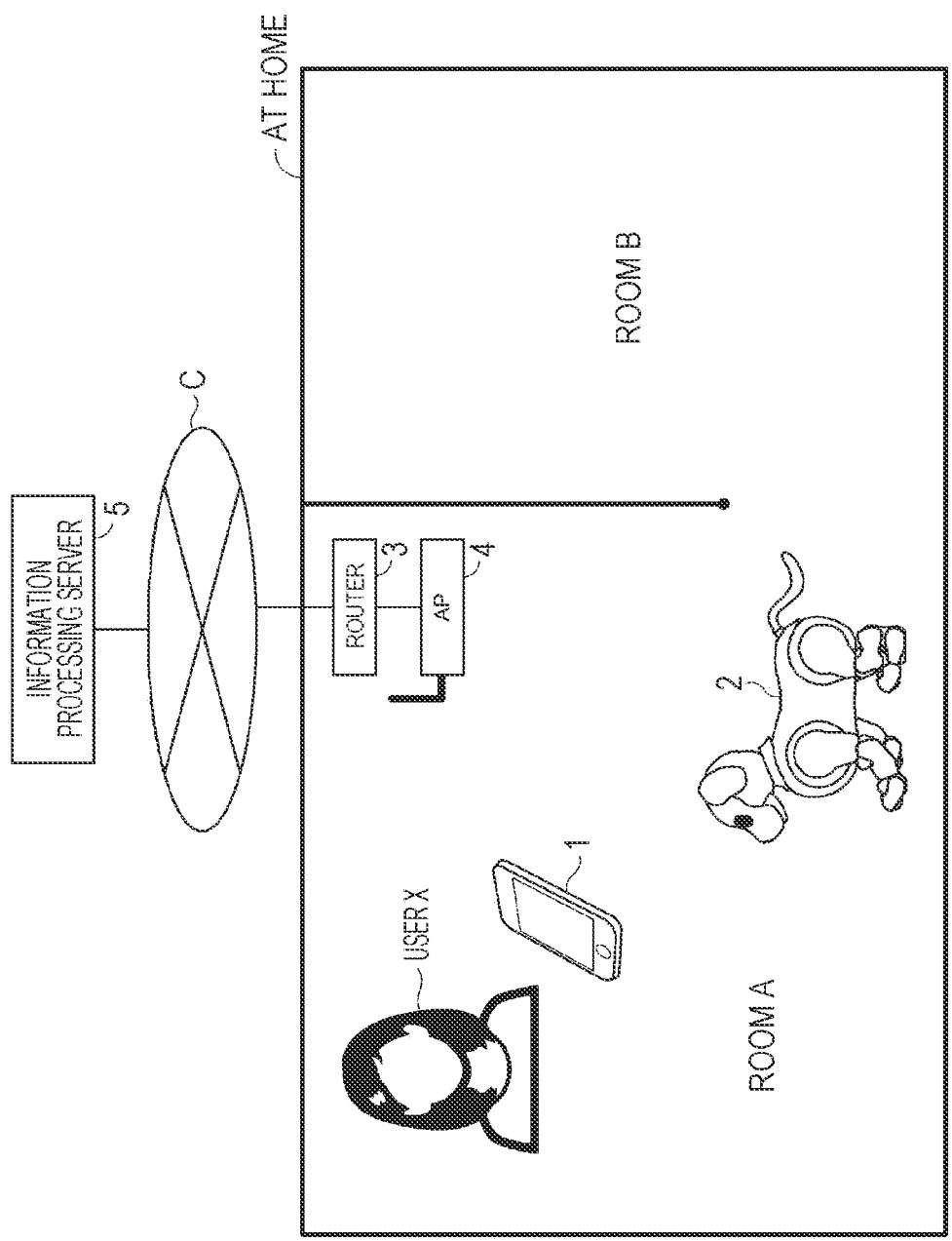
FIG. 1 is a diagram for explaining a usage situation of an information processing system according to an embodiment.

FIG. 1 is a diagram for explaining a usage situation of an information processing system according to an embodiment. In the present embodiment, a situation is assumed in which a user X owns a mobile terminal 1 and uses a walking (movable) robot 2 at home. At home, communication equipment that can be connected to a communication network C such as the Internet is provided. As the communication equipment, a router 3 connected to the communication network C and an access point 4 connected to the router are provided. By carrying out wireless communication with the access point 4, the mobile terminal 1 and the robot 2 can communicate with an information processing server 5 and the like connected to the communication network C.

Figure 2:
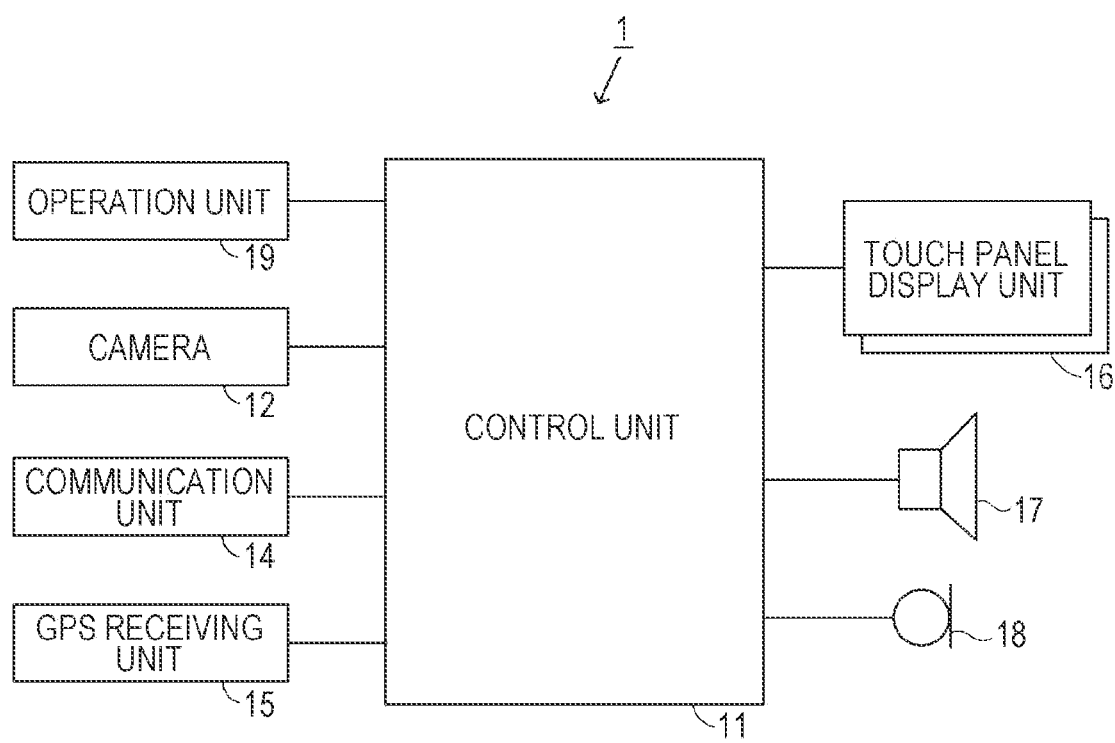
FIG. 2 is a block diagram showing a configuration of a mobile terminal according to an embodiment.

FIG. 2 is a block diagram showing a configuration of the mobile terminal 1 according to an embodiment. The mobile terminal 1 of the present embodiment is a so-called information processing apparatus such as a smartphone or a tablet. The mobile terminal 1 executes instruction proxy processing described later, but an apparatus to perform the instruction proxy processing is not limited to the mobile terminal 1, and it is possible to use various information processing apparatuses such as a robot, a smart speaker (AI speaker), or a TV set. The mobile terminal 1 of the present embodiment includes a control unit 11, an operation unit 19, a camera 12, a communication unit 14, a global positioning system (GPS) receiving unit 15, a touch panel display unit 16, a speaker 17, and a microphone 18.

The control unit 11 includes a central processing unit (CPU) capable of executing various programs, a ROM that stores various programs and data, a RAM, and the like, and is a portion that integrally controls the mobile terminal 1. The operation unit 19 is a portion that receives an operation from a user, such as a power button and a volume button. The camera 12 is provided on a front surface, a rear surface, or both of the mobile terminal 1, and is a portion that captures a still image or a moving image in accordance with a user's operation or the like.

The communication unit 14 is a portion that communicates with various external devices, and has a form of using the Wi-Fi standard in order to communicate with the access point 4, in the present embodiment. In addition to this, for the communication unit 14, instead of the access point 4, it is possible to use mobile communication means connectable to the communication network C via a mobile communication network, other than short distance communication means such as Bluetooth (registered trademark) or infrared communication.

The GPS receiving unit 15 is a location detection unit that can determine a location (latitude, longitude) of the mobile terminal 1 by receiving a signal from a satellite. As the location detection unit in the mobile terminal 1, in addition to the GPS receiving unit 15, by indoor positioning for detecting an indoor location or by storing a surrounding environment as mapping data and imaging with the camera 12, the location of the mobile terminal 1 may be determined.

The touch panel display unit 16 is a user interface in which a display unit using liquid crystal, organic EL, or the like and a touch panel using a pressure sensitive method, an electrostatic capacity method, or the like are layered, and various kinds of display can be performed on the display unit. Furthermore, it is possible to receive various inputs from a user through touch input on various objects displayed on the display unit. The speaker 17 can notify the user by sound. The microphone 18 can capture ambient sound of the mobile terminal 1.

Figure 3:
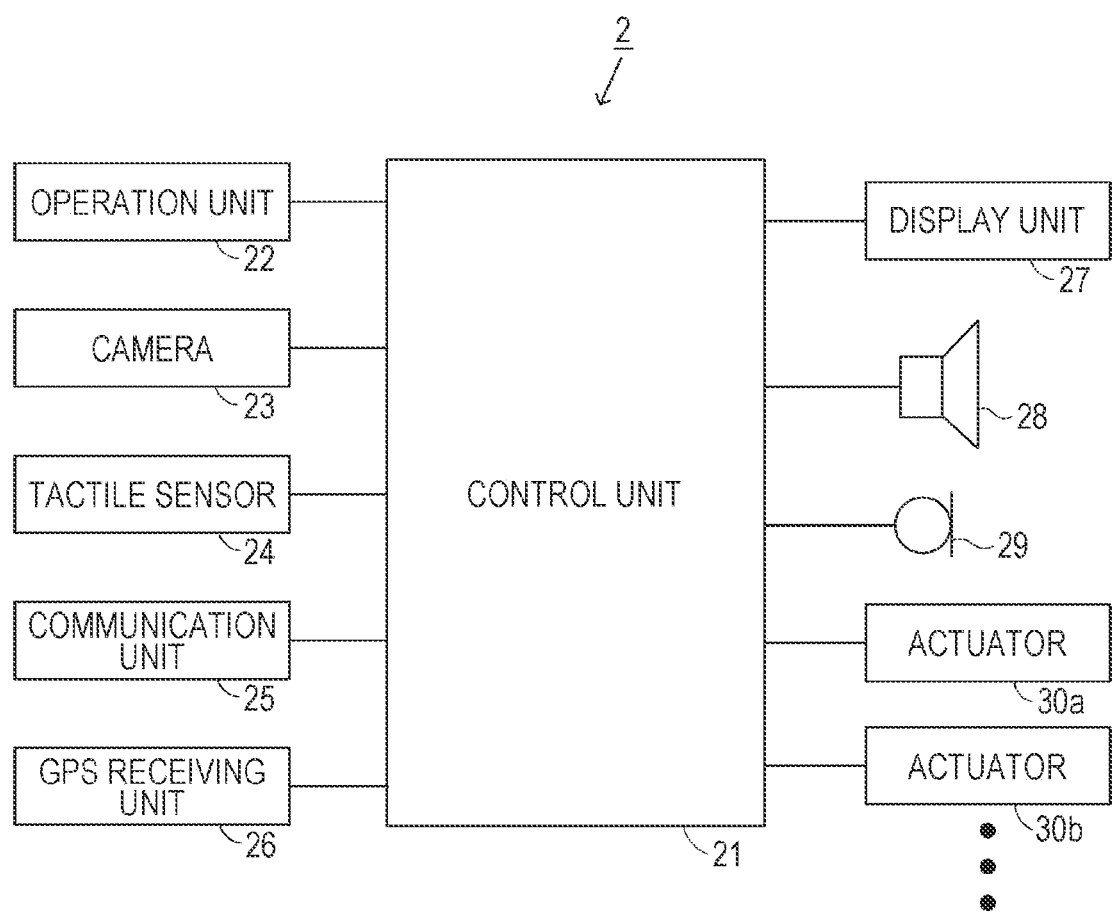
FIG. 3 is a block diagram showing a configuration of a robot according to an embodiment.

FIG. 3 is a block diagram showing a configuration of the robot 2 according to an embodiment. The robot 2 according to the present embodiment is a pet-shaped (dog-shaped) robot 2, and is a robot 2 capable of various communication with a user. In the present embodiment, the robot 2 capable of walking (moving) as an instruction target of the user X is taken as an example. However, without limiting to the robot 2, it is possible to use various information processing apparatuses capable of receiving instructions, such as, for example, a robot without movement, a smart speaker (AI speaker), and a TV set.

In the present embodiment, the robot 2 includes a control unit 21, an operation unit 22, a camera 23, a contact sensor 24, a communication unit 25, a GPS receiving unit 26, a display unit 27, a speaker 28, a microphone 29, and a plurality of actuators 30a, 30b . . . Note that a form of the robot 2 is merely an example, and various forms can be adopted.

The control unit 21 includes a CPU capable of executing various programs, a read only memory (ROM) that stores various programs and data, a random access memory (RAM), and the like, and integrally controls the robot 2. The operation unit 22 is a portion that receives an operation from a user, such as a power button. The camera 23 is a sensor that is provided on the head of the robot 2 or the like, and images and obtains a surrounding environment. The contact sensor 24 is a sensor provided on the head, the abdomen, the back, and the like of the robot 2, and is capable of detecting contact by the user.

The communication unit 25 is a portion that communicates with various external devices, and has a form of using the Wi-Fi standard in order to communicate with the access point 4, in the present embodiment. Similarly to the mobile terminal 1, for the communication unit 25, instead of the access point 4, it is also possible to use mobile communication means connectable to the communication network C via a mobile communication network, other than short distance communication means such as Bluetooth (registered trademark) or infrared communication.

The display unit 27 is display means with a liquid crystal, organic EL, or the like provided at an eye position on the head of the robot 2, and emotion of the robot 2 can be expressed by changing a display content. The display unit 27 may be provided in addition to this. For example, various states of the robot 2 (for example, a battery state, a communication state, and the like) can be externally notified by providing a light emitting diode (LED) or the like. The speaker 28 can notify the user by sound, and can express emotion of the robot 2 by emitting animal sound or the like, for example. The microphone 18 can capture ambient sound of the mobile terminal 1, and, for example, can capture various instructions uttered by the user and execute various processes.

The actuators 30a and 30b are provided at joints of the limbs, the neck, the tail, and the like of the robot 2, and are driven by instructions from the control unit 21. In particular, the robot 2 can walk (move) by driving actuators provided at joints of the limbs.

FIG. 1 shows an environment in which the mobile terminal 1 and the robot 2 described in FIGS. 2 and 3 are used at home. Conventionally, in a case where the robot 2 is used at home or the like, the user X can communicate with the robot 2 by giving a voice instruction to the robot 2. However, in a case where the robot 2 is in a power off state, a pause state due to battery exhaustion or the like, a state where a location is a room B and voice of the user X cannot be received sufficiently, and the like, there is a situation where the robot 2 cannot react even when the user X gives an instruction.

In such a situation, there is a case where the user X does not know why the robot 2 has not reacted to the own instruction, and there is a loss of interaction between the user X and the robot 2, such as giving an instruction again. One object of the information processing system of the present embodiment is to suppress, under such circumstances, an interaction loss between a user and various information processing apparatuses such as the robot 2 that can be communicated by the user, and to perform smooth communication.

Therefore, in the information processing system of the present embodiment, in the mobile terminal 1 that is a separate body other than the robot 2 that is an instruction target individual, the instruction proxy processing is performed for instructions given to the robot 2. Hereinafter, the instruction proxy processing will be described with a situation of FIG. 1 as an example.

In FIG. 1, the user X who is a mother prepares a meal in a room A (kitchen), and cannot see a state of the room B (living room) because she is not available. The user X, who is about to finish preparing meals, utters, to the robot 2 in the room A, an instruction for calling a child, in order to call the child. Here, it is assumed that the robot 2 is named "Robo". An utterance content of the user X is "Robo, call the child." The instruction for the robot 2 is made by combining the "Robo" indicating an instruction target and an instruction content "call the child.". When the instruction is uttered by the user X, the robot 2 is in a situation of being in sleep and unable to receive the instruction.

Under such a situation, the mobile terminal 1 carried by the user X is executing the instruction proxy processing, and can act as a proxy with respect to the instruction issued to the robot 2.

Figure 5:
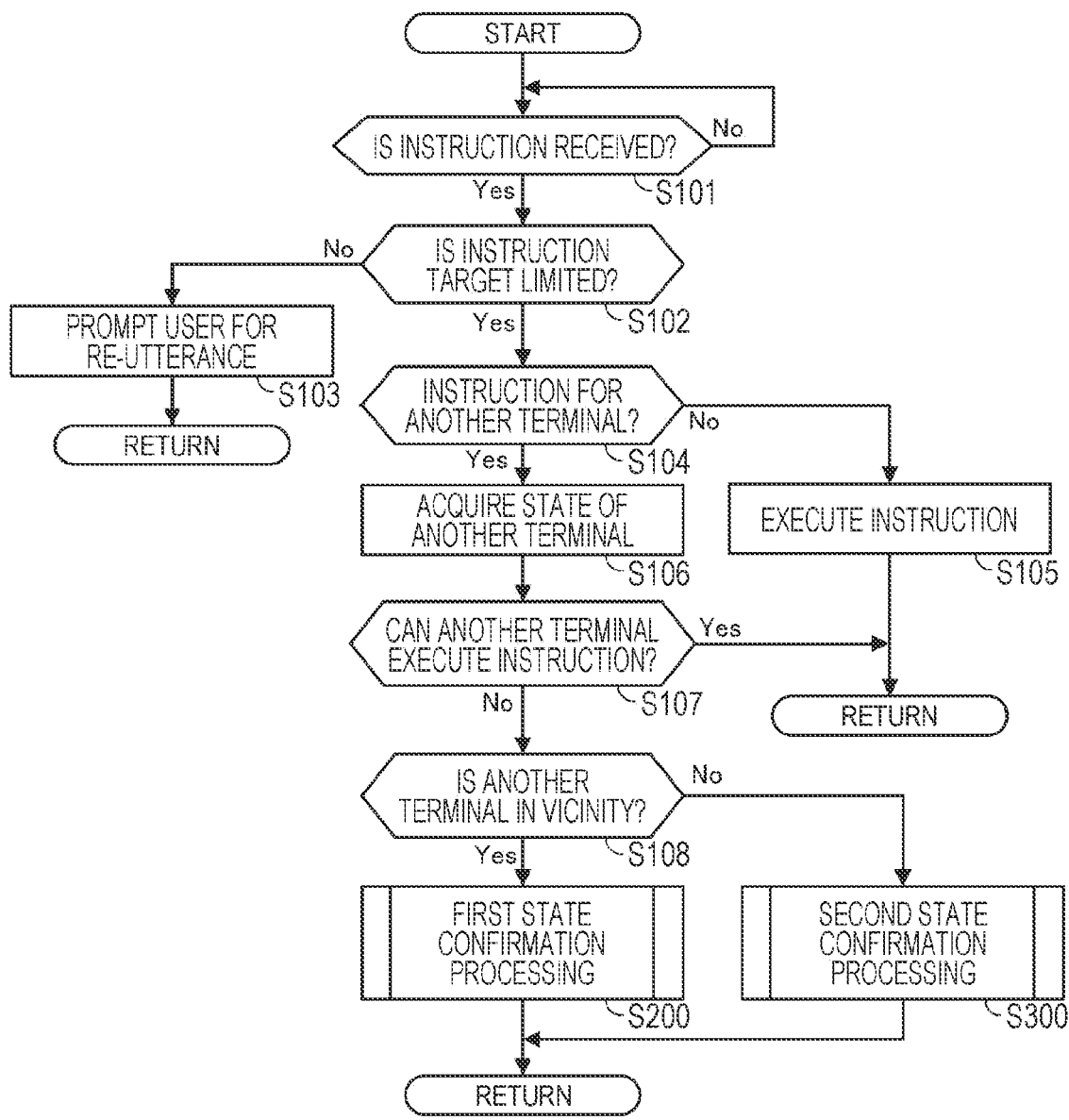
FIG. 5 is a flowchart showing instruction proxy processing executed by a mobile terminal according to an embodiment.

FIG. 5 is a flowchart showing the instruction proxy processing executed by the mobile terminal 1 according to the embodiment. Note that, in this description, the information processing apparatus including the mobile terminal 1 and the robot 2 may be simply referred to as a "terminal". The instruction proxy processing of the present embodiment is processing executed in the mobile terminal 1. During the execution, voice inputted to the microphone 18 is analyzed, and it is determined whether or not an instruction is received (S101). In the present embodiment, as described above, since the instruction is made by the combination of the instruction target and the instruction content, it is possible to clearly determine the instruction target. In addition to such a form, an instruction having no instruction target may be adopted. In that case, it is conceivable to determine the instruction target on the basis of various situations such as analysis of an utterance content itself, analysis of a past conversation content, a surrounding situation imaged by the camera 23, or the like.

In a case where the received instruction target is not limited (S102: No), in the present embodiment, a voice notification or the like is made from the speaker 17 to prompt the user X for re-utterance (S103). For example, in a space where multiple robots 2 exist, in a case where an instruction having no instruction target or an instruction still having ambiguity with the instruction target is uttered, the mobile terminal 1 notifies the user X by voice or display of "The target of the instruction cannot be specified. Please specify the instruction target." and the like. Here, the instruction command still having ambiguity with the instruction target is such as a case where, for example, utterance is made without giving an instruction target in an environment in which the number of terminals that can be the instruction target is other than 1 (0 or 2 or more), within a range of a radius N meters of the mobile terminal 1. Specifically, this corresponds to, for example, an instruction of "Do . . . " and the like without explicitly uttering the instruction target in a space where two or more instruction target individuals exist.

Whereas, in a case where the instruction target is limited in the received instruction, (S102: Yes), it is determined whether the instruction is for the own terminal (in this case, the mobile terminal 1) or for another terminal (S104). In a case where the instruction is for the own terminal (S104: No), the instruction is executed in the mobile terminal 1 (S105). Whereas, in a case where the instruction is for another terminal (S104: Yes), the communication unit 14 is used to acquire a state of another terminal (S106). In a case of FIG. 1, in a case of acquiring a status of the robot 2 from the mobile terminal 1, the status of the robot 2 may be directly acquired by wireless communication with each other via the access point 4, or the status of the robot 2 may be indirectly obtained by the mobile terminal 1 accessing the information processing server 5, by uploading a status of the robot 2 to the information processing server 5 in advance. Alternatively, both may be used in combination, such as acquiring indirectly in a case where direct acquisition is disabled.

After acquiring the status of the another terminal, it is determined whether or not the another terminal can execute the instruction (S107). In a case where the instruction can be executed (S107: Yes), the instruction is to be processed by the another terminal, and therefore the process returns to the beginning of the instruction proxy processing. Whereas, in a case where the another terminal cannot execute the instruction (S107: No), it is determined whether or not the another terminal is in the vicinity of the mobile terminal 1 (S108). The determination whether or not being in the vicinity can be determined by referring to location information included in the acquired situation of the robot 2 and location information determined by the GPS receiving unit 15 of the mobile terminal 1. In a case where both pieces of the location information are within a predetermined distance, it is determined as being in the vicinity (S108: Yes), and first state confirmation processing (S200) is executed. Whereas, in a case where both pieces of the location information are outside the predetermined distance, it is determined as being not in the vicinity (S108: No), and second state confirmation processing (S300) is executed.

A situation in FIG. 1 is a case where an instruction for the robot 2 is uttered by the user X, and is a case where it is determined that the instruction cannot be executed by the user X (S107: No) because the robot 2 is paused. Furthermore, it is a case where it is determined that the mobile terminal 1 and the robot 2 are in the vicinity. Therefore, in the situation of FIG. 1, the first state confirmation processing (S200) is executed.

Figure 6:
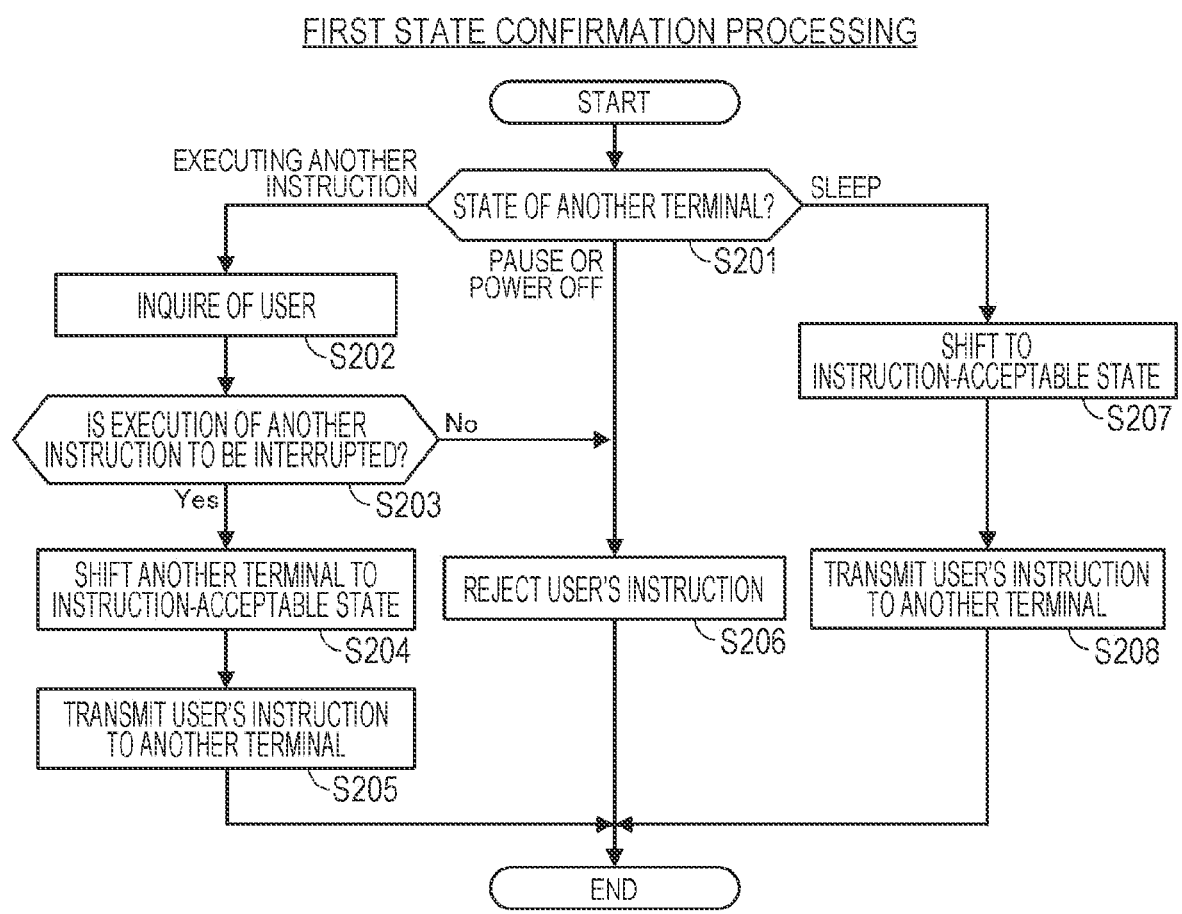
FIG. 6 is a flowchart showing first state confirmation processing executed by a mobile terminal according to an embodiment.

FIG. 6 is a flowchart showing the first state confirmation processing (S200) executed by the mobile terminal according to the embodiment. In the present embodiment, the status of the another terminal acquired in S106 is classified into three states, namely, (1) a state where another instruction is being executed, (2) a state where intervention of the user X is required in order to shift the another terminal to an instruction-acceptable state, for example, a pause or power off state, and (3) a state where intervention of the user X is not required to shift the another terminal to the instruction-acceptable state, for example, a sleep state. In the first state confirmation processing, it is determined which state the another terminal is, among these three states (S201).

In a case of (1) the state where the another terminal is executing another instruction (S201: executing another instruction), first, by using voice from the speaker 17 of the mobile terminal 1 or the touch panel display unit 16 of the mobile terminal 1, a notification is made to inquire of the user X about whether or not to cancel the instruction (another instruction) currently being executed by the another terminal (S202).

In a case where there is an input from the user X for interrupting the execution of the another instruction by a voice reply or an input to the touch panel display unit 16 (S203: Yes), the another instruction is interrupted in the another terminal, and shift is made to the instruction-acceptable state (S204). Here, the instruction-acceptable state means that the another terminal is in a state of being able to accept an instruction of the user X and to execute the instruction. Then, the instruction held in the mobile terminal 1, that is, the instruction received in S101 is transmitted to the another terminal (S205). Whereas, in a case where the execution of another instruction is not interrupted (S203: No), the instruction from the user X is rejected (S206). As described above, in the present embodiment, in the terminal to be the instruction target, in a case where the instruction cannot be executed, that is, another instruction is interrupted and the instruction is executed, or a case where the terminal to be the instruction target is paused or powered off as will be described later, the received instruction is to be rejected. In a case of rejecting the instruction, the mobile terminal 1 may notify the user X that the instruction has been rejected and a reason why the instruction has been rejected.

FIG. 1 shows an example in which the robot 2 is paused. In a case where the robot 2 is executing another instruction when the user X utters an instruction, the user X is asked about execution interruption of the another instruction (S202). Then, in a case where the user X makes an input to interrupt (S203: Yes), the instruction that has already been uttered is transmitted to the robot 2 (S205). Therefore, the user X does not need to repeatedly utter the same instruction again, and can smoothly communicate with the robot 2.

In a case of (2) the state where intervention of the user X is required to shift the another terminal to the instruction-acceptable state, here, a state where the another terminal is in a pause or power off state (S201: pause or power off), the instruction of the user X is rejected (S206). In this case, since no reaction or response is obtained from the robot 2 although the user has uttered an instruction to the another terminal (the robot 2 in the case of FIG. 1), it is possible to perform, in the mobile terminal 1, notification processing of notifying the user X of the situation of the robot 2 by voice from the speaker 17 or display of the touch panel display unit 16.

In a case of (3) the state where intervention of the user X is not required to shift the another terminal to the instruction-acceptable state, here, a state where the another terminal is in a sleep state (S201: sleep), the mobile terminal 1 causes the another terminal to shift to an instruction-acceptable state by communicating with the another terminal as an instruction target (S207). After the another terminal is shifted to the instruction-possible state, the instruction held in the mobile terminal 1, that is, the instruction received in S101 is transmitted to the another terminal (S208). In this case, similarly to (1) the state where the another terminal is executing another instruction, the user X does not need to repeatedly utter the same instruction again, and can smoothly communicate with the robot 2.

Figure 4:
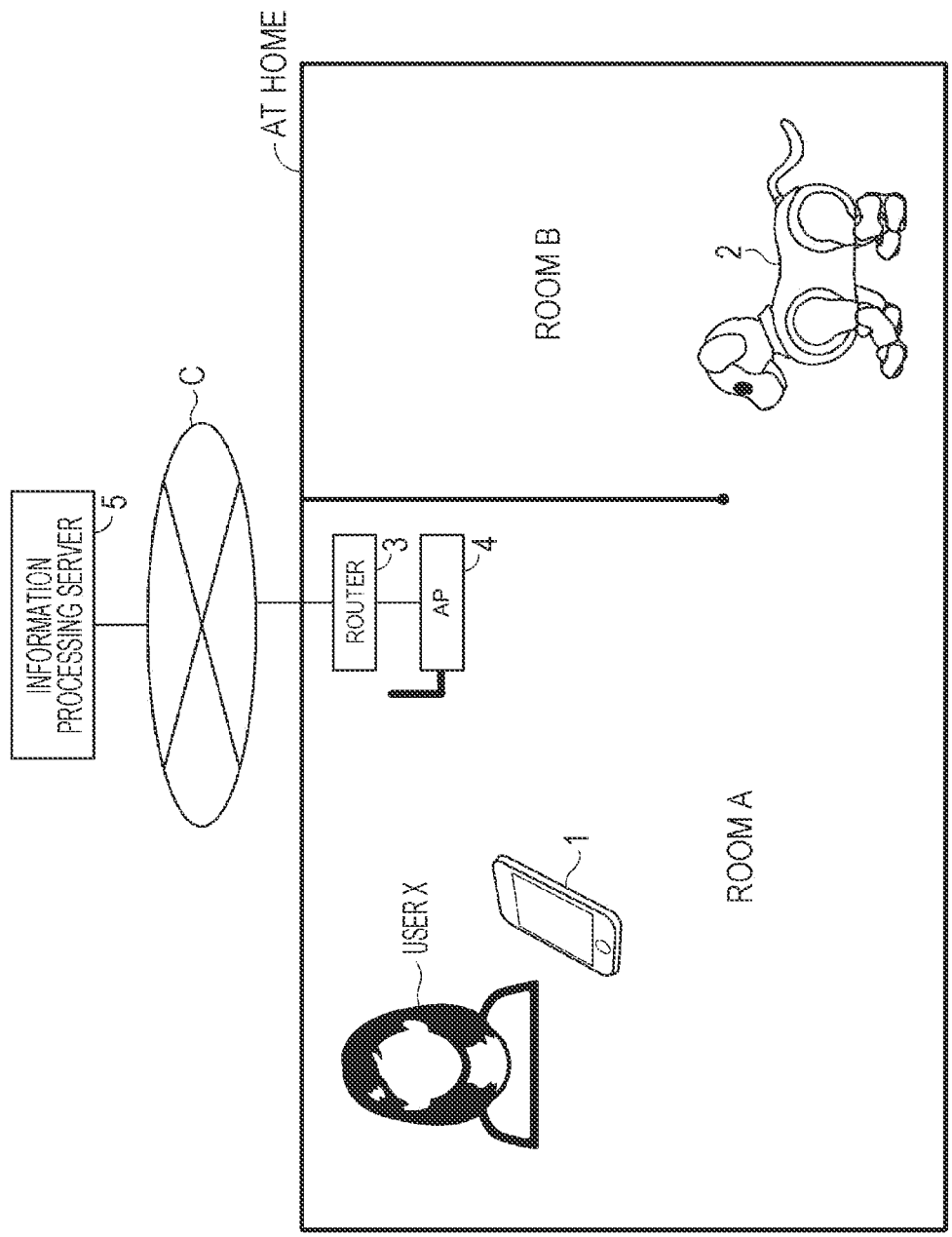
FIG. 4 is a diagram for explaining a usage situation of an information processing system according to an embodiment.

Next, the second state confirmation processing (S300), that is, a case where the another terminal is not in the vicinity of the mobile terminal 1 (S108: No) will be described. FIG. 4 is a diagram for explaining a usage situation of an information processing system according to an embodiment. A situation of FIG. 4 shows a case where the robot 2 is in the room B different from the user X, and the another terminal (robot 2) is not in the vicinity of the mobile terminal 1. In such a case, there may be a case where an instruction uttered by the user X is not received by the robot 2, and the instruction of the user X is wasted, that is, there is a loss in interaction between the user X and the robot 2.

Similarly to a case of the first state confirmation processing (S200), in the second state confirmation processing (S300), a status of the another terminal is classified into three states, namely, (1) a state where another instruction is being executed, (2) a state where intervention of the user X is required in order to shift the another terminal to an instruction-acceptable state, for example, a pause or power off state, and (3) a state where intervention of the user X is not required to shift the another terminal to the instruction-acceptable state, for example, a sleep state. In the first state confirmation processing, it is determined which state the another terminal is, among these three states (S301).

In a case of (1) the state where the another terminal is executing another instruction (S301: executing another instruction), first, by using voice from the speaker 17 of the mobile terminal 1 or the touch panel display unit 16 of the mobile terminal 1, a notification is made to inquire of the user X about whether or not to cancel the instruction (another instruction) currently being executed by the another terminal (S302).

In a case where there is an input from the user X for interrupting the execution of the another instruction by a voice reply or an input to the touch panel display unit 16 (S303: Yes), the another instruction is interrupted in the another terminal, and shift is made to the instruction-acceptable state (S304). Whereas, in a case where the execution of another instruction is not interrupted (S303: No), the instruction from the user is rejected (S308).

After the input is made to interrupt the execution of the another instruction, in the mobile terminal 1, it is determined whether or not the another terminal is a movable body, that is, a movable terminal such as the robot 2 (S305). This determination may be performed by preliminarily storing information of the another terminal in the mobile terminal 1, or by acquiring information of the another terminal together when acquiring a state of the another terminal together in S106, or the like. In a case where it is determined to be a movable body (S305: Yes), the another terminal is moved to the vicinity of the user X, that is, the vicinity of the mobile terminal 1 (S306). In a case of FIG. 4, the robot 2 is to be moved from the room B to the room A where the mobile terminal 1 is located. After the movement is completed, the instruction held in the mobile terminal 1, that is, the instruction received in S101 is transmitted to the another terminal (S307). Whereas, in a case where the another terminal is not a movable body (S305: No), the instruction received in S101 is transmitted to the another terminal without moving the another terminal (S307).

In this way, in a case where the another terminal is a movable body, it becomes possible to appropriately perform communication between the user X and the another terminal (the robot 2 in FIG. 4) at a short distance, by moving the another terminal to the vicinity of the mobile terminal 1, that is, to the vicinity of the user X, and then causing the another terminal to execute an instruction from the user X.

In a case where (2) the another terminal is in a pause or power off state (S301: pause or power off), the user's instruction is rejected (S308). In this case, similarly to the case of the first state confirmation processing, the mobile terminal 1 may perform the notification processing of notifying the user X of the status of the robot 2.

In a case where (3) the another terminal is in a sleep state (S301: sleep), the mobile terminal 1 causes the another terminal to shift to the instruction-acceptable state by communicating with the another terminal as an instruction target (S309). Thereafter, by executing the processing of S310 to 312, which is processing similar to that of S305 to 307, in a case where the another terminal is a movable body (S310: Yes), the another terminal is moved to the vicinity of the user X (S311), and then the instruction received in S101 is transmitted to the another terminal (S312). Whereas, in a case where the another terminal is not a movable body (S310: No), the instruction received in S101 is transmitted to the another terminal without moving the another terminal (S312).

The information processing system according to the first embodiment has been described above. In the information processing system of the present embodiment, in the information processing apparatus (the mobile terminal 1 in the case of FIG. 1) other than the information processing apparatus (the robot 2 in the case of FIG. 1) to be an instruction target, it is possible to suppress an interaction loss and realize smooth communication between the user and the information processing apparatus to be an instruction target, by executing the instruction proxy processing.

2. Second Embodiment

Figure 8:
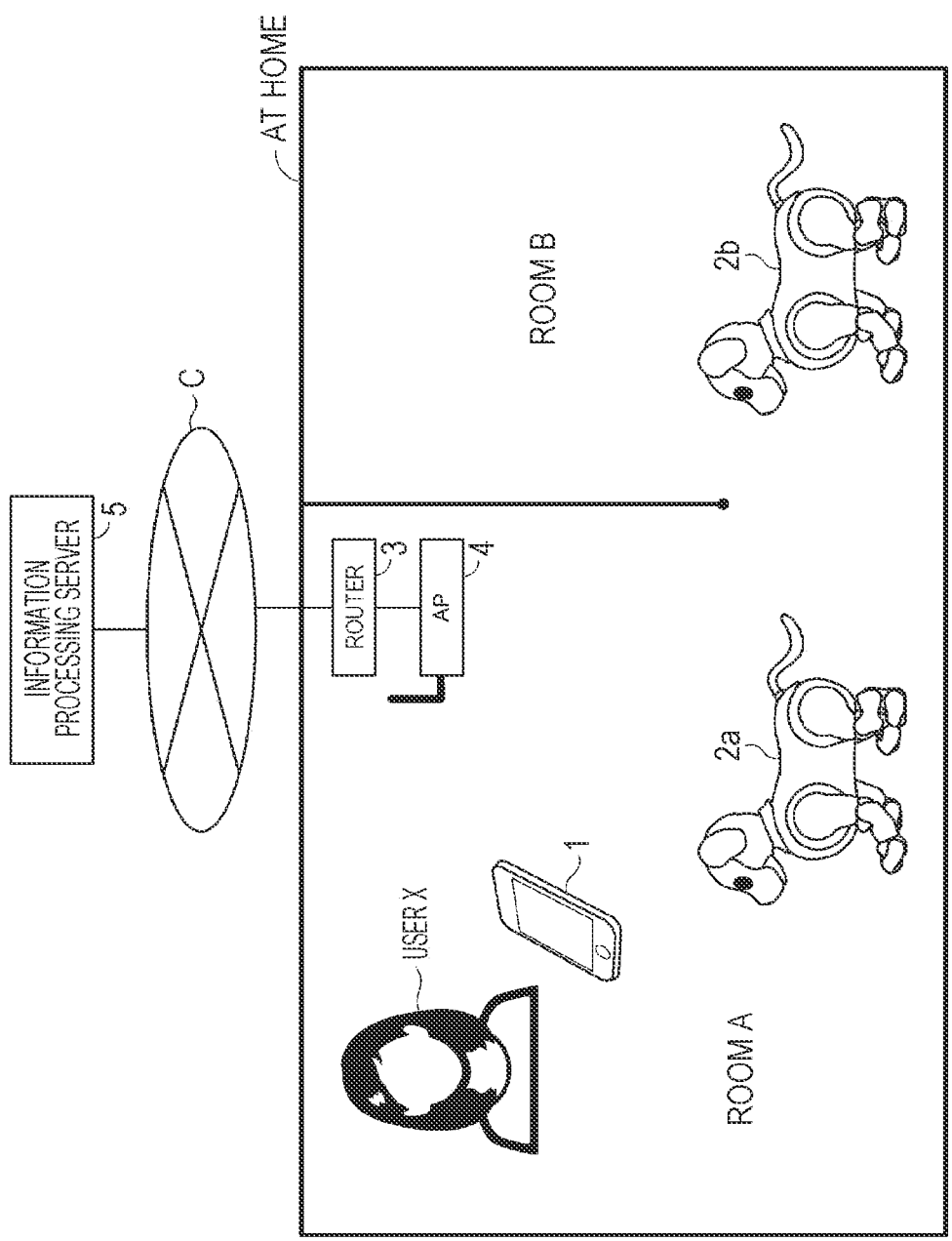
FIG. 8 is a diagram for explaining a usage situation of an information processing system according to an embodiment.

FIG. 8 is a diagram for explaining a usage situation of an information processing system according to an embodiment. In the first embodiment, the description has been given to a case where the number of robots 2 to be an instruction target is one. As the robot 2 becomes widespread in the future, using a plurality of robots 2 in one home is considered. The second embodiment is a case where such a situation is taken into consideration, and shows a situation where a plurality of robots 2a and 2b is used at home.

In the example of FIG. 8, the robot 2a in a room A is in an instruction-acceptable state, and the robot 2b in a room B is paused. Here, a name of the robot 2a is assumed as "Robo a" and a name of the robot 2b is assumed as "Robo b". It is assumed that a user X utters, for example, similarly to the first embodiment, "Robo b, call the child." to the robot 2b. Since the robot 2b is located in the room B away from the user X and is paused, the instruction of the user X cannot be processed. In the second embodiment in which there is the plurality of robots 2a and 2b, it is possible for the robot 2a to execute an instruction for the robot 2b, instead of the robot 2b.

Figure 7:
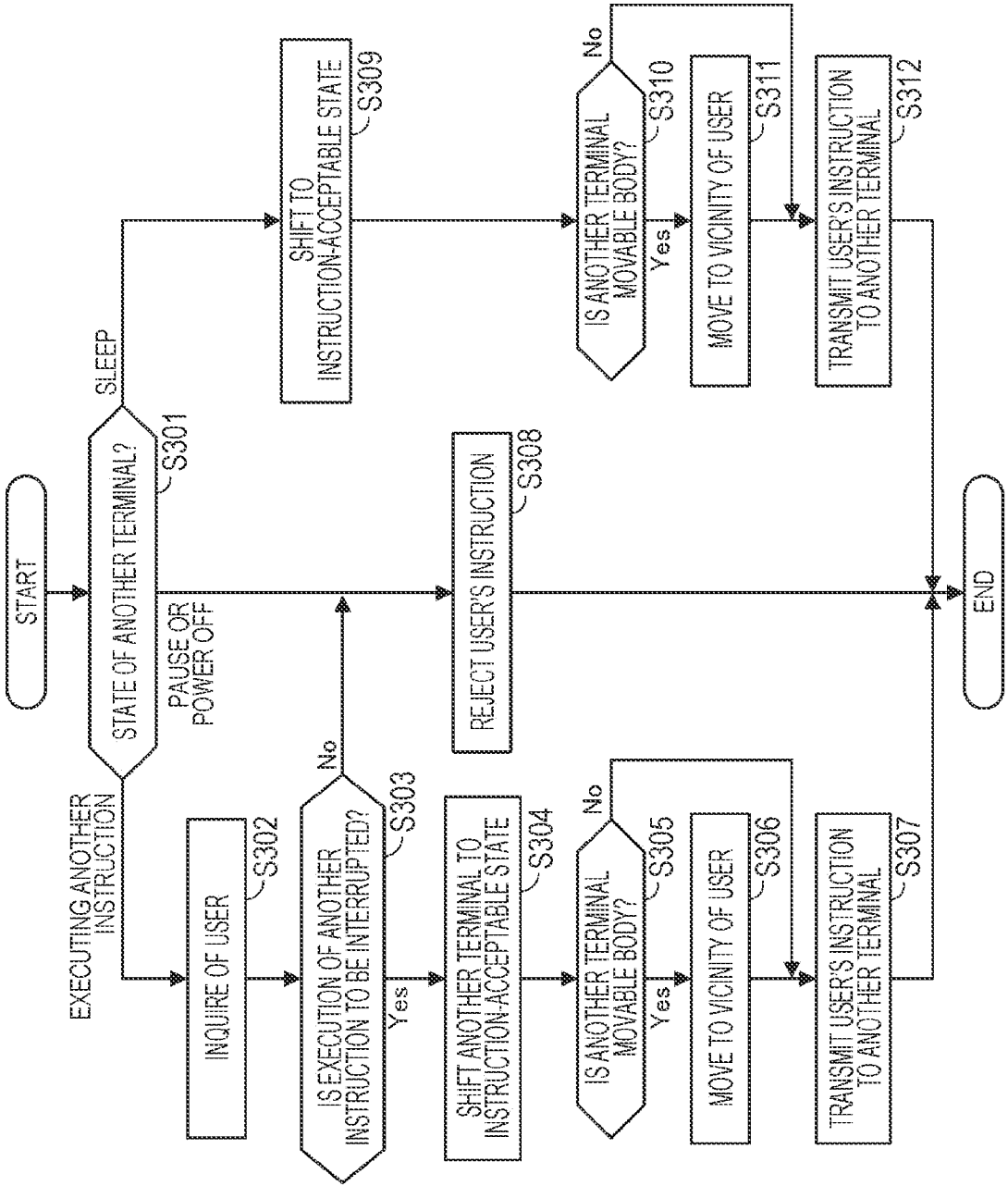
FIG. 7 is a flowchart showing second state confirmation processing executed by a mobile terminal according to an embodiment.
Figure 9:
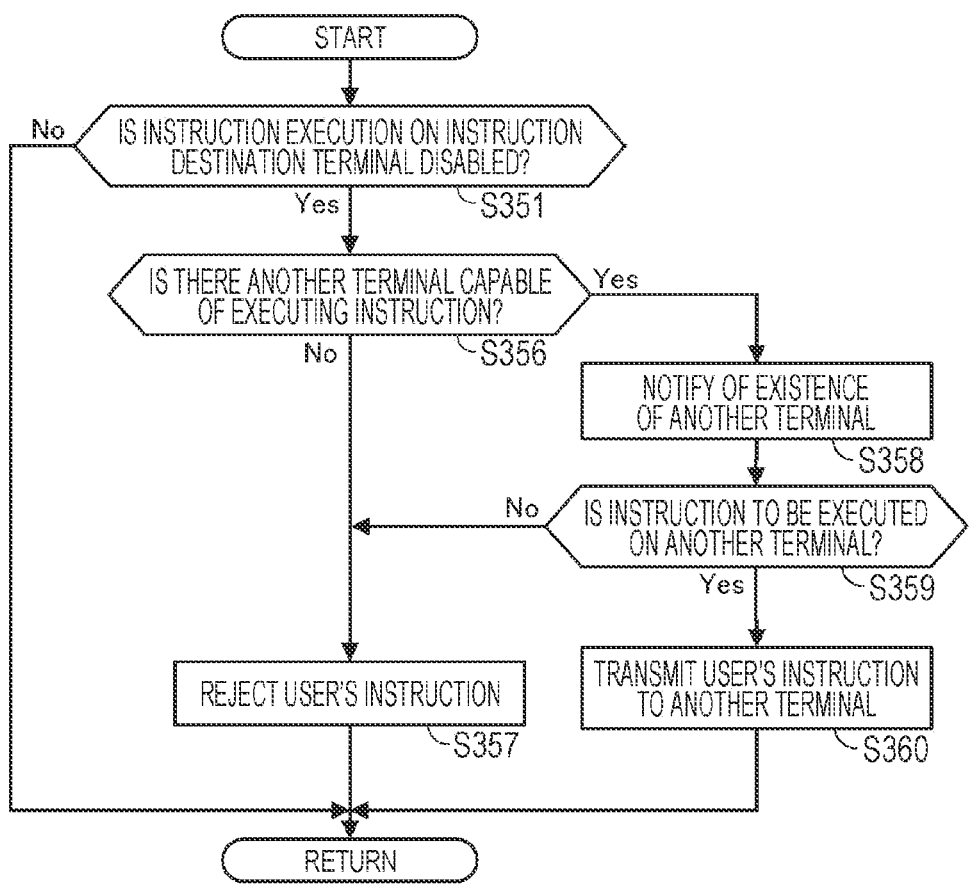
FIG. 9 is a flowchart showing instruction destination changing processing executed by a mobile terminal according to an embodiment.

FIG. 9 is a flowchart showing instruction destination changing processing executed by a mobile terminal according to the embodiment. In the instruction destination changing processing, in the first state confirmation processing (S200) described in FIG. 6, or in the second state confirmation processing (S300) described in FIG. 7, it is monitored whether or not instruction execution is disabled in another terminal that is an instruction destination (S351). Here, the case where instruction execution is disabled means that an instruction cannot be processed in any way by the instruction destination terminal, which corresponds to a case where the user's instruction is rejected in the first state confirmation processing (S200) and the second state confirmation processing (S300).

This corresponds to, for example, a case where an indication is given not to interrupt execution of the another instruction (S203: No), or a case where a status of the another terminal is in a pause or power off state (S201: pause or power off) in the first state confirmation processing (S200), and a case where an indication is given not to interrupt execution of the another instruction (S303: No), or a case where a status of the another terminal is in a pause or power off state (S301: pause or power off) in the second state confirmation processing (S300).

In a case where it is determined that such an instruction destination terminal (the another terminal) cannot execute the instruction (S351: Yes), it is determined whether there is another terminal capable of executing the instruction (S356). In a case where there is a plurality of different terminals capable of executing the instruction, another terminal near the user X, that is, another terminal close to the mobile terminal 1 is selected as a candidate. In a case where execution is made by another terminal, the execution is to be made by a terminal different from the instruction of the user X. Therefore, in the present embodiment, a notification is made to the user of existence of another terminal, and to ask the user X about whether or not the instruction may be executed by the another terminal as a proxy, to take confirmation of the user X (S358). In a case where the user X inputs an indication to execute the instruction on the another terminal (S359: Yes), the instruction of the user is transmitted to the another terminal, and the instruction is executed by the another terminal (S360). Whereas, in a case where an indication not to execute the instruction on the another terminal is inputted (S359: No), the instruction of the user is rejected (S357).

In the example of FIG. 8, the user X has uttered "Robo b, call the child" to the robot 2b. However, since the robot 2b is paused, the mobile terminal 1 notifies the user X of a content "Robo b is paused. Do you want Robo a to perform the processing as a proxy?" (S358). In a case where the user X gives an indication of a content for acting as a proxy (S359: Yes), the mobile terminal 1 transmits the instruction for the robot 2b to the robot 2a (S360). Whereas, in a case where the user X gives an indication of a content for not acting as a proxy (S359: No), the instruction to the robot 2b is rejected (S357).

As described above, in the second embodiment in which there is the plurality of robots 2a and 2b, it is possible for the robot 2a to execute an instruction for the robot 2b, instead of the robot 2b.

3. Modification

Although a plurality of embodiments of the present disclosure has been specifically described above, the contents of the present disclosure are not limited to the above-described embodiments, and various modifications based on the technical idea of the present disclosure are possible. Hereinafter, a modification will be described.

(Case where there is Plurality of Information Processing Apparatuses)

FIG. 10 is a diagram for explaining a usage situation of an information processing system according to an embodiment. In the first and second embodiments, the mobile terminal 1 owned by the user X is used as the information processing apparatus that executes the instruction proxy processing and the instruction destination changing processing. Currently, at home, not only a mobile terminal 1a but also a TV set 1b and a speaker 1c (sometimes called a smart speaker, an AI speaker, and the like) are considered as an information processing apparatus capable of an interactive response to a user. In such an information processing apparatus, various kinds of control can be performed by utterance of a user X. In an environment where a plurality of information processing apparatuses is used, it is preferable that any one information processing apparatus executes instruction proxy processing and instruction destination changing processing.

For example, with the following settings, it is possible to select one information processing apparatus that executes the instruction proxy processing and the instruction destination changing processing.

(1) A user sets in advance. By setting, by the user itself, the information processing apparatus that executes the instruction proxy processing and the instruction destination changing processing for the robot 2, it is possible to determine one information processing apparatus that executes the instruction proxy processing and the instruction destination changing processing.

(2) A wearable device is prioritized. A reason why the wearable device is prioritized is that the wearable device is assumed to be close to the user's mouth, the wearable device is easy to recognize a user's utterance, and then, the wearable device is assumed to often be in a state of constantly accepting user's conversation. In a case where there is a plurality of wearable devices, it is conceivable to select one that is assumed to be closer to the user's mouth in accordance with a type of the wearable device.

(3) An information processing apparatus located near the user is prioritized. It is conceivable to measure a distance between the information processing apparatus and the user by using various sensors such as a GPS receiving unit, a camera, or an infrared sensor provided to the information processing apparatus, and select an information processing apparatus closest to the user. Note that, in an information processing apparatus having a microphone, it is also possible to determine an information processing apparatus that can receive larger voice from a user, as an information processing apparatus located closer to the user.

(4) Communication is performed among a plurality of information processing apparatuses to determine one information processing apparatus. At that time, the determination may be made in consideration of the conditions described in the above (1) to (3).

(5) The information processing server 5 determines one information processing apparatus. The information processing server 5 may acquire information regarding a plurality of information processing apparatuses, and determine an information processing apparatus appropriate for executing the instruction proxy processing and the instruction destination changing processing.

(Case where there is Plurality of Users)

For example, in the first state confirmation processing (S200) described in FIG. 6, in a case where the robot 2 is executing another instruction, a notification is made to inquire of the user X about whether or not to cancel the instruction (another instruction) currently being executed by the another terminal (S202). In a case where there is a plurality of users, it is conceivable that a request-source user of the another instruction and a request-source user of this instruction are different. Therefore, in the notification of S202, it is preferable to also notify of the request-source user of the another instruction. At that time, in a case of receiving an instruction, it is preferable to recognize a request-source user of the instruction and store in association with the instruction, by using speaker recognition using instruction utterance of the request-source user, face recognition or the like using a face image of the request-source user, or both. Furthermore, there may be cases where it is not desirable for the instruction to be interrupted by another user. Therefore, when interrupting execution of another instruction, the request-source user may be inquired about whether or not the instruction execution can be interrupted.

(Instruction Other than Voice)

In the first and the second embodiments, the description has been given with an instruction by voice as an instruction for the robot 2. However, in addition to a voice instruction, an instruction to the robot 2 may be issued by a user operation using, for example, a remote control device, a gesture, or the like.

(Modification of Instruction Destination Changing Processing)

In the instruction destination changing processing described in FIG. 9, in a case where instruction execution by the instruction destination terminal is disabled (S351), another terminal capable of executing the instruction is searched for. Then, in a case where another terminal exists, the user's instruction is transmitted to the another terminal. In the instruction destination changing processing, instead of such a form, even in a case where the instruction destination terminal can execute the instruction, the user's instruction may be transmitted to the another terminal in a case where there is another terminal that can execute an instruction earlier.

In a situation of FIG. 8, it is assumed that both the robot 2a and the robot 2b are in an instruction-executable state. In such a situation, in a case where the user X utters "Robo b, what is the weather today?" to the robot 2b, the robot 2b is to move from the room B to the room A and then execute the instruction. Whereas, in the room A, there is the robot 2a in the instruction-executable state. The robot 2a closer to the user X is considered to execute the instruction faster than the robot 2b moving from the room B to the room A and executing the instruction. Therefore, by transmitting the instruction of the user X to another terminal that can execute the instruction faster, the instruction of the user X can be processed quickly. Also in this case, a notification is preferably made to the user X of existence of another terminal, and to ask the user X about whether or not the instruction may be executed by the another terminal as a proxy, to take confirmation of the user X. Furthermore, in a case of executing the instruction as a proxy, the user may be allowed to select a robot to act as a proxy, in addition to a form of automatically selecting an optimum robot with the mobile terminal 1. For example, on the mobile terminal 1, the user is asked to make confirmation of "Robo b has been specified, but Robo a is nearby. What do you want to do?" to select which of the robot 2a or 2b is caused to execute the instruction.

(Modification of Ambiguous Instruction)

In the instruction proxy processing described with reference to FIG. 5, in a case where the instruction target is not limited, re-utterance of the user is prompted. In addition to this, as an ambiguous instruction, there is a case where the instruction content itself remains ambiguous although the instruction target is specified. For example, this corresponds to a case where the user X utters "Robo, um, get that, that." and the like. In such a case, since the instruction target is clear, there is no problem even if the mobile terminal 1 executes the processing (S106) of acquiring a state of the instruction target terminal in the instruction proxy processing described in FIG. 5. However, the notification to the user X by the mobile terminal 1 is desirably at the end of the utterance of the user X, and it is desirable that the mobile terminal 1 does not transmit the instruction to the terminal in a case where the instruction itself to the terminal remains ambiguous, even if the utterance of the user X is finished. Note that, in order to determine whether or not the instruction remains ambiguous, a determination method may be considered, for example, such as recognition of an instruction that has a remarkably-low reliability score and is outside an acceptable instruction set.

The present disclosure can also be realized by an apparatus, a method, a program, a system, and the like. For example, by enabling downloading of a program that performs the functions described in the above embodiments, and downloading the program by an apparatus that does not have the functions described in the embodiments, the control described in the embodiments can be performed in the apparatus. The present disclosure can also be realized by a server that distributes such a program. Furthermore, the items described in each of the embodiments and the modifications can be appropriately combined.

The present disclosure may have the following configurations.

(1)
An information processing apparatus including:
a control unit configured to receive an instruction from a user, and execute instruction proxy processing in a case where the instruction specifies another information processing apparatus as an instruction target.

(2)
The information processing apparatus according to (1), in which
the instruction proxy processing is executed in a case where a state of the information processing apparatus that is an instruction target is acquired, and an instruction cannot be executed by the information processing apparatus.

(3)
The information processing apparatus according to (1) or (2), in which
the instruction proxy processing causes the information processing apparatus that is an instruction target to shift to an instruction-acceptable state.

(4)
The information processing apparatus according to (3), in which
after the information processing apparatus that is an instruction target is shifted to an instruction-acceptable state, the instruction proxy processing transmits the instruction received from a user to the information processing apparatus that is an instruction target.

(5)
The information processing apparatus according to any one of (1) to (4), in which when the information processing apparatus that is an instruction target is executing another instruction, the instruction proxy processing inquires of a user about execution interruption of another instruction.

(6)
The information processing apparatus according to (5), in which
the instruction proxy processing transmits the instruction received from a user to the information processing apparatus that is an instruction target, in a case where execution interruption of another instruction is indicated by a user.

(7)
The information processing apparatus according to any one of (1) to (6), in which
the instruction proxy processing rejects the instruction received from a user, in a case where the instruction is determined to be unexecutable in the information processing apparatus that is an instruction target.

(8)
The information processing apparatus according to any one of (1) to (7), in which
the instruction proxy processing causes the information processing apparatus that is an instruction target to move, in a case where the information processing apparatus that is an instruction target is a movable body.

(9)
The information processing apparatus according to (8), in which
the instruction proxy processing causes the information processing apparatus that is an instruction target to move to approach an own position.

(10)
The information processing apparatus according to any one of (1) to (9), in which
in a case where there is an information processing apparatus capable of executing an instruction received from a user other than the information processing apparatus that is an instruction target, the instruction is transmitted to such the information processing apparatus.

(11)
An information processing system including:
an information processing apparatus configured to receive an instruction from a user, and execute instruction proxy processing in a case where the instruction specifies another information processing apparatus as an instruction target.

(12)
The information processing system according to (11), in which
in a case where there is a plurality of information processing apparatuses capable of executing the instruction proxy processing, any one of the information processing apparatuses executes the instruction proxy processing.

(13)
An information processing method including:
receiving an instruction from a user, and executing instruction proxy processing in a case where the instruction specifies another information processing apparatus as an instruction target.

(14)
An information processing program
for receiving an instruction from a user, and causing a computer to execute instruction proxy processing in a case where the instruction specifies another information processing apparatus as an instruction target.

REFERENCE SIGNS LIST

1 Mobile terminal (information processing apparatus)
17 Speaker
1*a* Mobile terminal
18 Microphone
1*b* TV set
19 Operation unit
1*c* Speaker 21 Control unit
2 (2a, 2b) Robot
22 Operation unit
3 Router
23 Camera
4 Access point
24 Contact sensor
5 Information processing server
25 Communication unit
11 Control unit
26 GPS receiving unit
12 Camera
27 Display unit
14 Communication unit
28 Speaker
15 GPS receiving unit
29 Microphone
16 Touch panel display unit
30a, 30b . . . Actuator

The invention claimed is:

1. A first information processing apparatus, comprising:
a central processing unit (CPU) configured to:
receive a first instruction;
determine, based on the received first instruction, a second information processing apparatus as an instruction target;
acquire a state of the second information processing apparatus;
determine, based on the acquired state, the second information processing apparatus is unable to execute the first instruction;
determine each of:
first location information of the first information processing apparatus, and
second location information of the second information processing apparatus, wherein the second location information is determined based on the acquired state;
determine, based on the determination that the second information processing apparatus is unable to execute the first instruction, both the first location information and the second location information are outside a threshold distance;
execute an instruction proxy process based on the determination that both the first location information and the second location information are outside the threshold distance; and
transmit, based on the execution of the instruction proxy process, the first instruction to one of the second information processing apparatus or a third information processing apparatus.

2. The first information processing apparatus according to claim 1, wherein the CPU is further configured to cause, based on the acquired state, the second information processing apparatus to shift to an instruction-acceptable state.

3. The first information processing apparatus according to claim 2, wherein the CPU is further configured to:
determine, based on the acquired state, the second information processing apparatus is currently executing a second instruction; and
cause the second information processing apparatus to shift to the instruction-acceptable state, based on the determination that the second information processing apparatus is currently executing the second instruction.

4. The first information processing apparatus according to claim 2, wherein the CPU is further configured to:
determine, based on the acquired state, the second information processing apparatus is in a sleep state; and
cause the second information processing apparatus to shift to the instruction-acceptable state, based on the determination that the second information processing apparatus is in the sleep state.

5. The first information processing apparatus according to claim 2, wherein the CPU is further configured to transmit the first instruction to the second information processing apparatus after the second information processing apparatus shifts to the instruction-acceptable state.

6. The first information processing apparatus according to claim 1, wherein the CPU is further configured to:
determine, based on the acquired state, the second information processing apparatus is currently executing a second instruction; and
output an inquiry to a user for interruption of the execution of the second instruction.

7. The first information processing apparatus according to claim 6, wherein the CPU is further configured to transmit the first instruction to the second information processing apparatus in a case where the interruption of the execution of the second instruction is indicated by the user.

8. The first information processing apparatus according to claim 1, wherein the CPU is further configured to:
determine, based on the acquired state, the execution of the first instruction is disabled in the second information processing apparatus; and
reject the first instruction based on the determination that the execution of the first instruction is disabled in the second information processing apparatus.

9. The first information processing apparatus according to claim 1, wherein the CPU is further configured to:
determine the second information processing apparatus is a movable body; and
cause the second information processing apparatus to move, based on the determination that the second information processing apparatus is the movable body.

10. The first information processing apparatus according to claim 9, wherein the CPU is further configured to cause the second information processing apparatus to move to approach a position of the first information processing apparatus.

11. The first information processing apparatus according to claim 1, wherein the CPU is further configured to:
determine, based on the acquired state, the execution of the first instruction is disabled in the second information processing apparatus;
determine the third information processing apparatus that has a capability to execute the first instruction, based on the determination that the execution of the first instruction is disabled in the second information processing apparatus; and
transmit the first instruction to the third information processing apparatus.

12. The first information processing apparatus according to claim 11, wherein the CPU is further configured to:
output a notification indicating an existence of the third information processing apparatus;
receiving a confirmation to execute the first instruction on the third information processing apparatus; and
transmit the first instruction to the third information processing apparatus.

13. The first information processing apparatus according to claim 1, wherein the CPU is further configured to:
determine, based on the determination that the second information processing apparatus is unable to execute the first instruction, the second information processing apparatus is at a specific distance from the first information processing apparatus;

execute a state confirmation process based on the determination that the second information processing apparatus is at the specific distance from the first information processing apparatus; and execute the instruction proxy process based on the execution of the state confirmation process.

14. An information processing method, comprising:
in a first information processing apparatus:
receiving a first instruction;
determining, based on the received first instruction, a second information processing apparatus as an instruction target;
acquiring a state of the second information processing apparatus;
determining, based on the acquired state, the second information processing apparatus is unable to execute the first instruction;
determining each of:
first location information of the first information processing apparatus, and
second location information of the second information processing apparatus, wherein the second location information is determined based on the acquired state;
determining, based on the determination that the second information processing apparatus is unable to execute the first instruction, both the first location information and the second location information are outside a threshold distance;
executing an instruction proxy process based on the determination that both the first location information and the second location information are outside the threshold distance; and
transmitting, based on the execution of the instruction proxy process, the first instruction to one of the second information processing apparatus or a third information processing apparatus.

15. A non-transitory computer-readable medium having stored thereon computer-executable instructions which, when executed by a processor of a first information processing apparatus, cause the processor to execute operations, the operations comprising:
receiving a first instruction;
determining, based on the received first instruction, a second information processing apparatus as an instruction target;
acquiring a state of the second information processing apparatus;
determining, based on the acquired state, the second information processing apparatus is unable to execute the first instruction;
determining each of:
first location information of the first information processing apparatus, and
second location information of the second information processing apparatus, wherein the second location information is determined based on the acquired state;
determining, based on the determination that the second information processing apparatus is unable to execute the first instruction, both the first location information and the second location information are outside a threshold distance;
executing an instruction proxy process based on the determination that both the first location information and the second location information are outside the threshold distance; and
transmitting, based on the execution of the instruction proxy process, the first instruction to one of the second information processing apparatus or a third information processing apparatus.

* * * * *